United States Patent [19]
Holm

[11] Patent Number: 5,570,363
[45] Date of Patent: Oct. 29, 1996

[54] TRANSFORM BASED SCALABLE AUDIO COMPRESSION ALGORITHMS AND LOW COST AUDIO MULTI-POINT CONFERENCING SYSTEMS

[75] Inventor: Robert E. Holm, Chandler, Ariz.

[73] Assignee: Intel Corporation, Santa Clara, Calif.

[21] Appl. No.: 316,542

[22] Filed: Sep. 30, 1994

[51] Int. Cl.$^6$ .................................................. H04M 3/56
[52] U.S. Cl. ............................ 370/62; 370/109; 379/202
[58] Field of Search ................................ 370/23, 62, 109; 379/202, 203–206, 158

[56] References Cited

U.S. PATENT DOCUMENTS 4,741,025  4/1988  Maruyama et al. ................. 370/62 X
5,390,177  2/1995  Nahumi .............................. 379/202 X

*Primary Examiner*—Melvin Marcelo
*Attorney, Agent, or Firm*—Blakely, Sokoloff, Taylor & Zafman

[57] ABSTRACT

A transform based compression mechanism to establish a single compression technique which is applicable for all audio compression ranging from very low bit rate speech to CD/Audio quality music. Additionally, a multiconferencing unit (multi-point bridge) is provided which takes advantage of the transform based compression algorithm by providing a simple, low cost way of combining multiple parties without the need for transcoding.

25 Claims, 8 Drawing Sheets

FIXED DATA RATE PACKETS FOR DIFFERENT AUDIO CLASSES

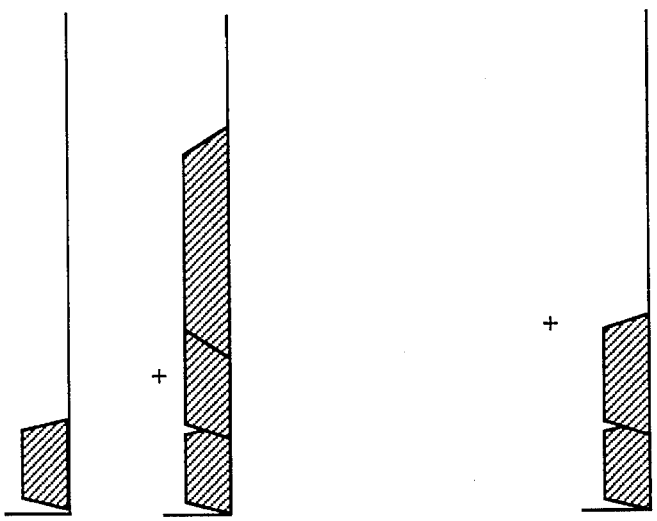
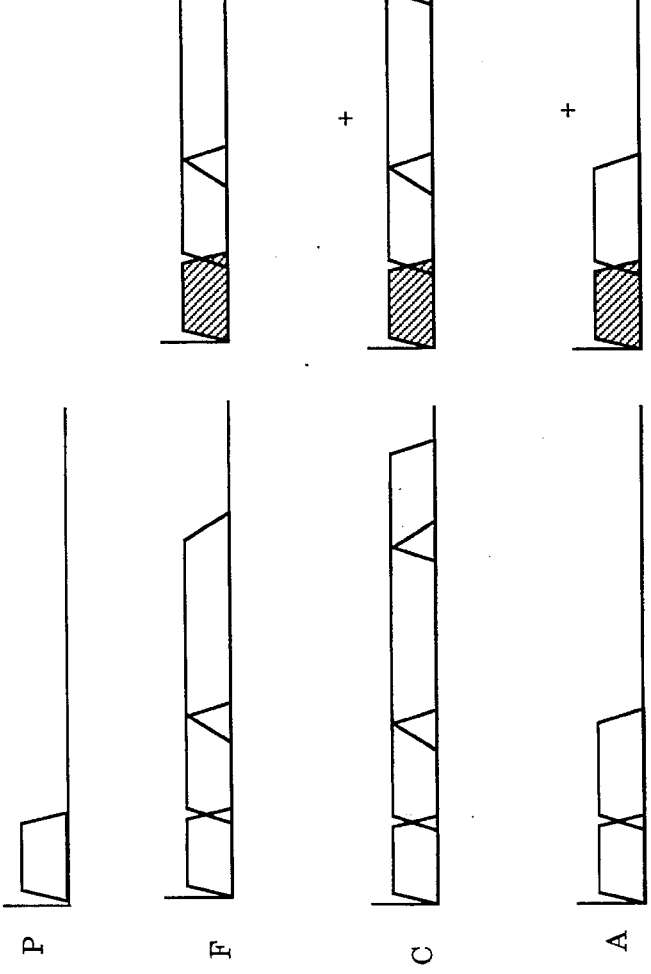
*Figure 6*

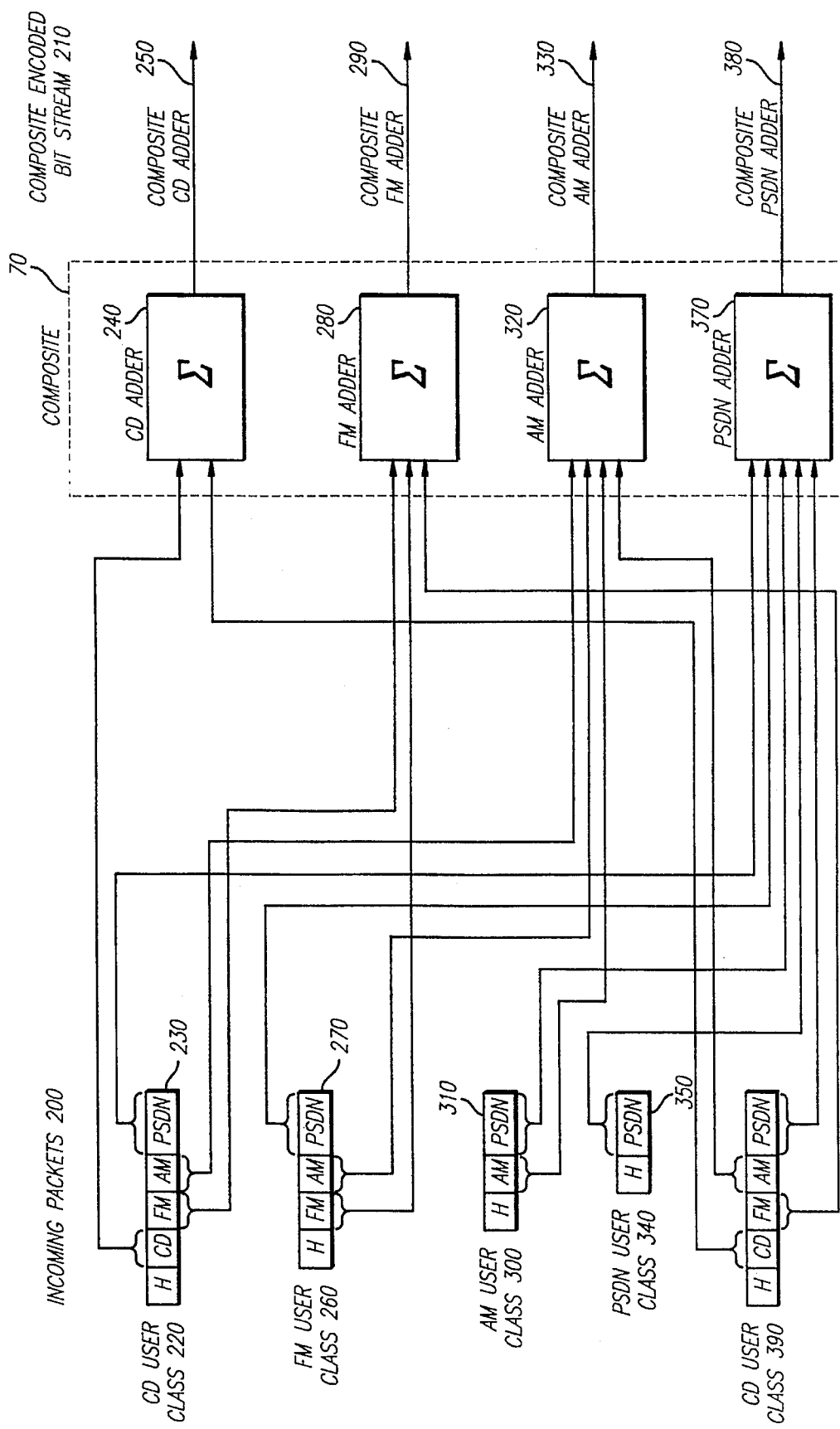

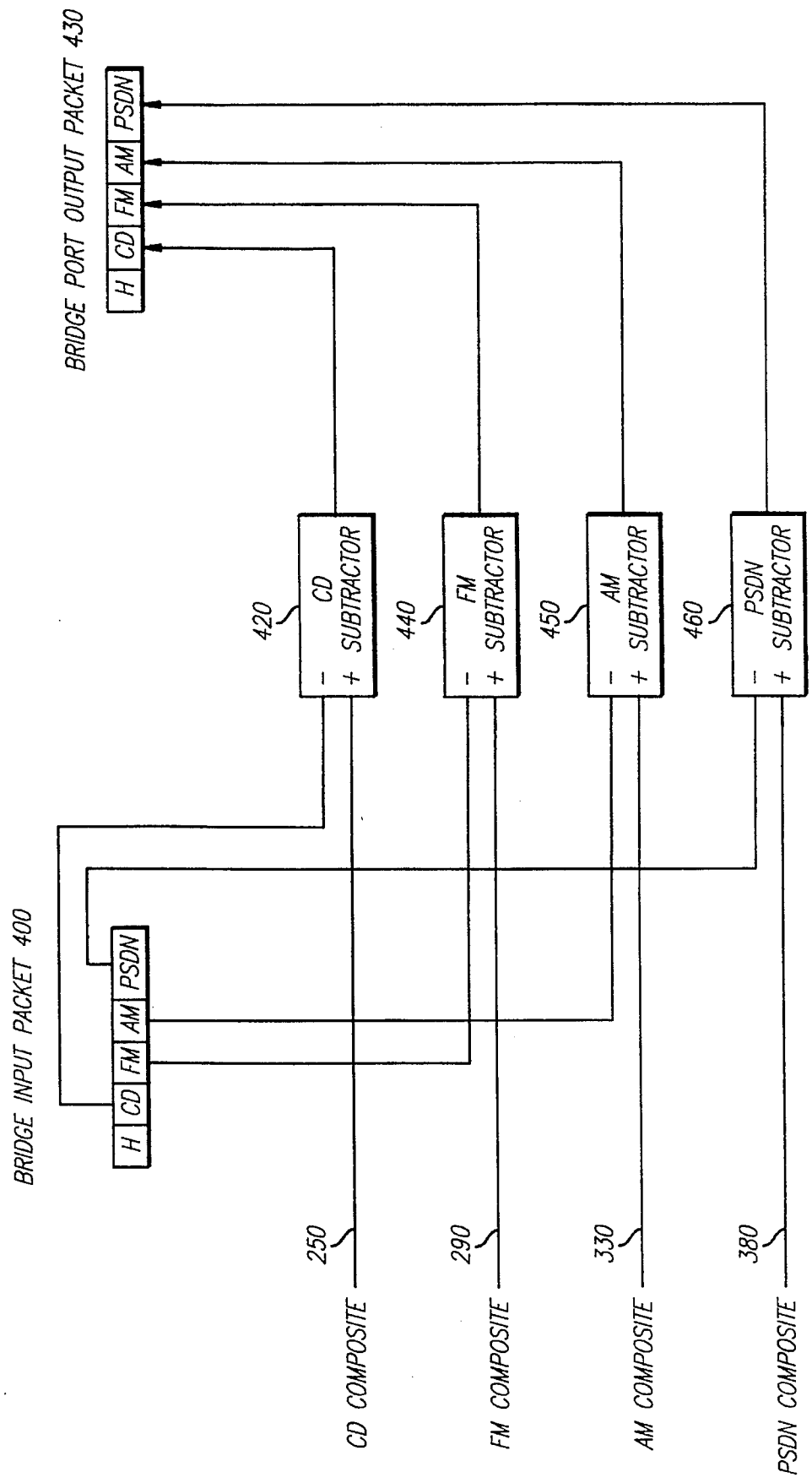

TRANSFORM BASED SCALABLE AUDIO COMPRESSION ALGORITHMS AND LOW COST AUDIO MULTI-POINT CONFERENCING SYSTEMS

BACKGROUND OF THE INVENTION (1). Field of the Invention

The present invention relates to the field of PC based conferencing systems. More particularly, the present invention relates to scalable audio compression and multi-point bridging.

(2). Background of the Invention

Historically, low bit rate digital audio transmission (below 16 Kbps) has required the use of vocoder modeling algorithms that implement speech compression only. Vocoders model individual vocal tracts. A limitation to this approach is that only a single voice can be modeled at one time. The vocal tract model is not conducive to other audio signal types such as music or multiple speakers. Higher bit rates could support PCM or ADPCM waveform sampling techniques that preserve the entire waveform at a cost of very high bit rates (32 Kbps for speech to 700 Kbps for CD/Audio). Several algorithms exist in the literature that are aimed specifically at low bit rate (low bandwidth) audio or CD/Audio compression only. However, there has been no approach suggested, which could scale from low bit rates for narrow band audio up to higher bit rates for high quality CD/audio, while still maintaining the total bit rate below ADPCM capabilities.

With the advent of desktop computer video conferencing, there is now a need to provide digital audio bridging which supports a variety of audio capabilities ranging from POTS ("plain old telephone system") audio (3.2 KHz) over standard modem lines (up to 28.8 Kbps) to CD/Audio (20 KHz) over ISDN (Integrated Systems Digital Network lines with a 64 to 128 Kbps data rate). Typical audio bridge circuits today are analog only and cannot support modems or other digital data transmission. Existing digital bridges are very complex and can typically only handle POTS speech bandwidths (some can handle AM radio bandwidths at 7 KHz). None of these bridges can deal with a variety of audio bandwidths simultaneously based on different bandwidths and quality levels available to different users (based on their "classes of service"). This requires all participants to use the "lowest common denominator" or the lowest shared class of service regardless of the capability available to the individual users.

Existing digital bridges using vocoders to digitize speech suffer from several costly problems. Since vocoders model individual vocal tracts, multiple voice signals entering an audio bridge must first be decoded back to PCM samples. Then a composite signal is formed in the PCM domain that is used to create the joint conversation fed back to each of the participants (minus their own signal). Each unique joint conversation must then be re-encoded before transmission back to each participant. This requires a separate decompression and compression (codec) unit for each participant resulting in a costly equipment implementation. Furthermore, since each codec can only model a single vocal tract, if there is background noise or multiple speakers, the quality of the re-compression will be reduced, in some cases substantially. Thus the second cost is in quality loss.

The method and apparatus for establishing a combination of scalable audio compression algorithms, defining communication protocols, and selecting compression to implement a low cost digital audio bridge that permits each user to maintain their highest class of service is desirable.

BRIEF SUMMARY OF THE INVENTION

The invention provides a method and apparatus to implement a SCALABLE transform-based audio compression system and a multi-point conferencing digital audio bridge system that uses SCALABLE compression and protocol. Multi-point conferencing is a key feature of PC based conferencing systems.

It is an object of the present invention to provide an audio compression algorithm technique that utilizes sub-band coding or transform coding to establish several classes of compression ranging from low bandwidth speech to CD/Audio.

It is also another object of the present invention to provide a multiconferencing unit which takes advantage of the above audio compression algorithms of the present invention to provide a simple, low cost way of combining multiple parties, with different classes of audio compression, without the need for lowest common denominator quality and without the need for expensive audio decoders and re-encoders (codecs).

Model based speech compression algorithms can only model a single speaker. Combining multiple speakers requires expensive decoding and recoding of each party. The transform based multiconferencing unit of the present invention takes advantage of the fact that transformed speech can be added directly to other similarly coded speech to form composite speech representing multiple parties.

The multiconferencing unit of the present invention utilizes transform based compression algorithms which convert time domain audio into frequency domain spectral components. By employing perceptual filtering, substantial compression is achieved over the entire audio range from low bandwidth audio to wide band audio, e.g. CD/Audio. The choice of filters is dependent on the type of audio being compressed. For example, speech compression may use sub-band filters whereas wide band audio uses "Masking" to reduce the data rate. The transform based compression algorithm of the present invention bridges the two extremes of audio compression ranging from speech to wide band audio and levels in between with a continuously variable transform implementation.

By eliminating the decode/recode step, the multiconferencing unit of the present invention is much simpler and less expensive than the prior art multiconferencing systems requiring the decode/recode steps. Additionally, all the processing inherent in the multiconferencing unit of the present invention can be performed digitally without the present need to revert to analog to implement the composite wave forms.

There are several more advantages inherent in the present invention. The SCALABLE compression algorithm accomplishes all classes of audio compression with a single type of mathematical formulation. This also makes it easier to identify the optimal computer architecture and features to implement this algorithm efficiently. This hastens the ability of PC's to implement the algorithm entirely in software and thereby save the additional cost of DSP chips and extra memory.

The SCALABLE compression algorithm can be adapted for both fixed and variable length protocols. The variable rate protocol for audio can optimize the combined audio/video bit rate for highest quality audio in a video conferencing system. The fixed rate protocol is necessarily less efficient in overall bit rate and has somewhat less quality but simplifies the procedure for implementing audio bridges.

The audio bridge takes advantage of the scalable compression protocol to simplify and maintain various classes of audio (POTS, AM, FM, CD/Audio) by combining those elements of the multiple participants which are usable by each of the participants (based on class of service for each participant's equipment).

The audio bridge minimizes the computational hardware by avoiding the decoding of each input and the subsequent re-encoding of the composite signals sent to each participant representing the conference audio. This is accomplished by the scalable compression algorithm linearity property plus the associated protocol for handling different classes of audio signal which simplifies the addition and subtraction of audio signals in their encoded states.

BRIEF DESCRIPTION OF THE DRAWINGS

FIG. 6 illustrates the effect of audio bridging for two users of different classes of audio.

FIG. 7 illustrates an exemplary port adder referenced in FIG. 4.

FIG. 8 illustrates an exemplary composite adder referenced in FIG. 4.

DETAILED DESCRIPTION OF THE INVENTION

Apparatus and methods for implementing both scalable audio compression algorithms (with associated protocol) and low cost audio conferencing bridges using the scalable audio compression algorithms and protocols are disclosed.

Figure 1:
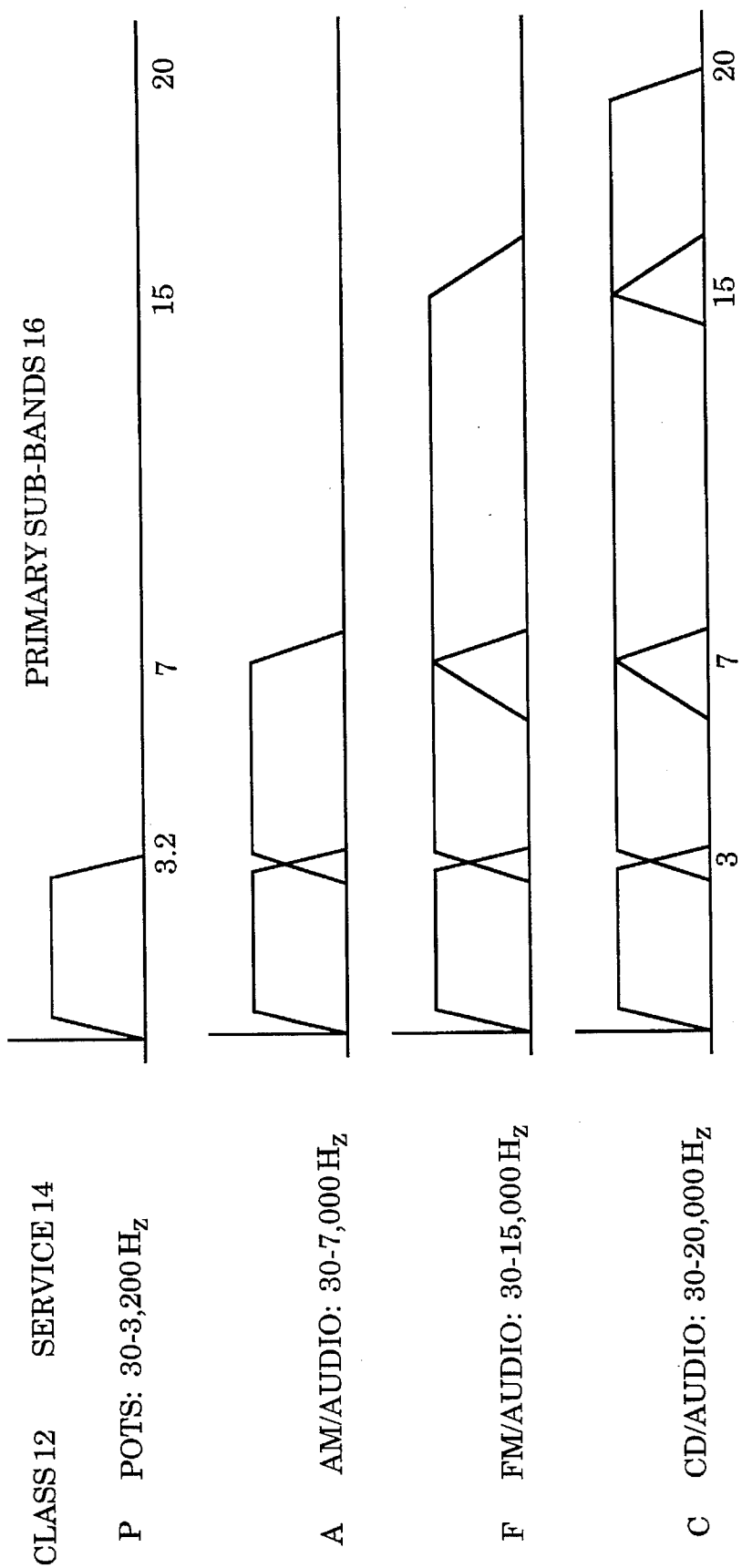
FIG. 1 illustrates exemplary classes of audio which may be accommodated by the multiconferencing unit of the present invention.

FIG. 1 illustrates four different exemplary classes of audio which may be combined for use with the multi-point conferencing unit of the present invention. The first column indicates class 12 for the different classes of audio. The second column indicates service 14 of the respective classes of audio. The third column indicates primary sub-bands 16 for each class of audio.

Class P refers to Plain Old Telephone Systems (POTS) and handles low quality audio in the bandwidth from 30 to 3,200 hertz. Class A is AM radio quality audio which is approximately 30 to 7,000 hertz. Class F is FM radio quality which is approximately 30 hertz to 15,000 hertz. The highest exemplary class, class C, is CD audio quality which is approximately 30 to 20,000 hertz. The lowest frequency is set to 30 Hz for all classes to achieve a common lower frequency in the lowest band.

Figure 2:
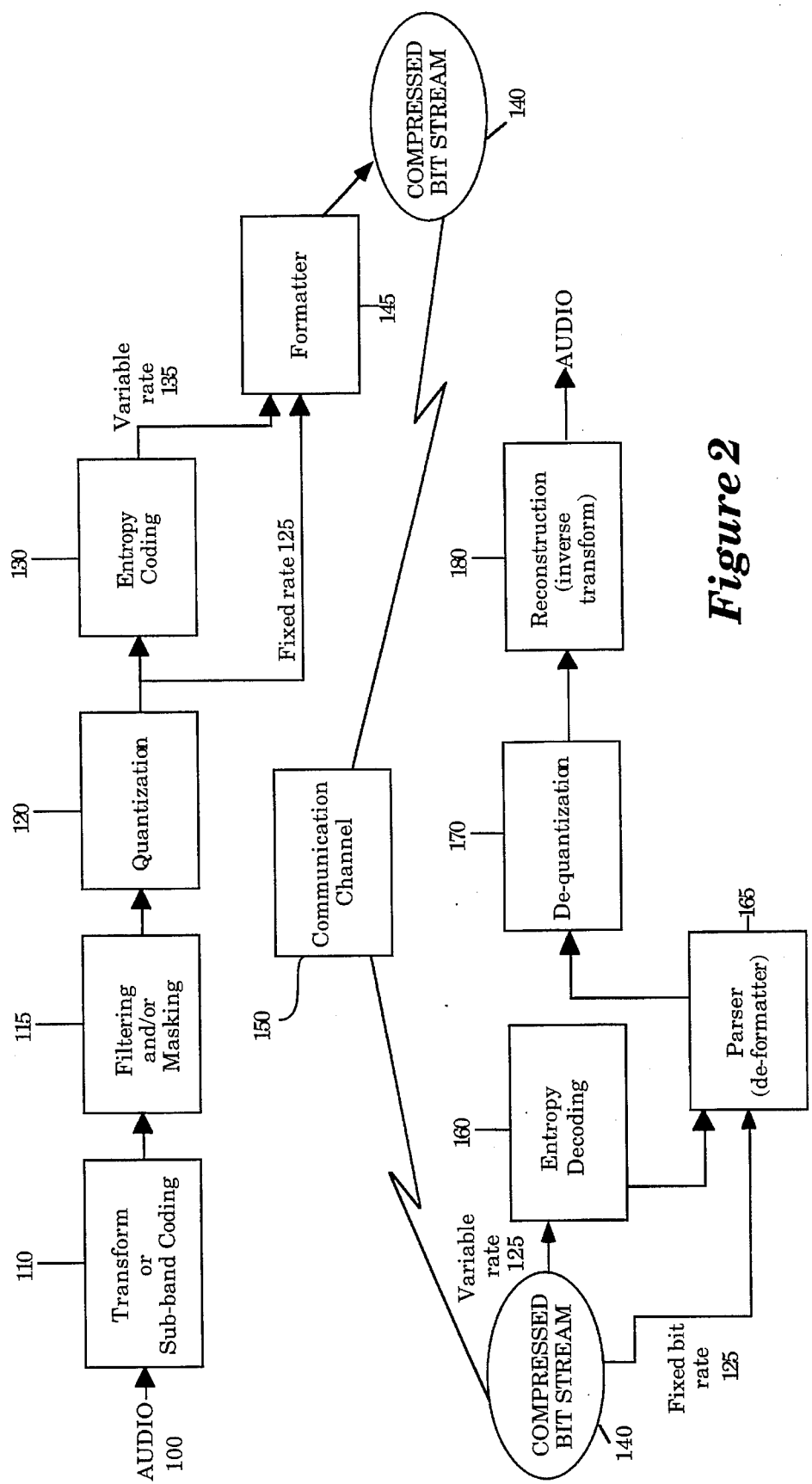
FIG. 2 illustrates an exemplary algorithm implementation used for the multi-point bridge of the present invention.

FIG. 2 is an exemplary scalable audio compression algorithm implementation for a point to point connection. The scalable audio compression algorithm and protocol of the present invention may be utilized for point-to-point communication as well as multi-point communication.

The scalable audio compression algorithms of the present invention are constrained only in this use of linear transformations for which signals may be added in either the time domain or the frequency domain with the same result, i.e. transform (A+B)=transform (A)+transform (B). This insures that in the audio conferencing bridge of the present invention, the compressed and encoded individual signals in the transform domain can be added or subtracted without the necessity of doing the inverse transforms first.

The scalable audio compression algorithms of the present invention is not limited by the transform technique used and is specifically open in this approach to allow improvements in techniques and quality as both computational complexity becomes cheaper and algorithms improve. The key to the present invention is the way the classes of signals are established, the protocol used which facilitates the digital audio bridging for conferencing, and requirements on the transformation algorithms.

Transforms must be linear in the time and transform domain. Fixed quantization tables are used to eliminate the need to dequantize signals before combining them. A method of scaling the combined, quantized signals to enable the composite signal to use the same quantization tables as the original signals is used. A method of entropy coding the quantized signals can be employed if variable rate audio signals are permitted (optimal use of communication bandwidth in point to point conferencing). For fixed rate audio, the output of the quantizer are formatted directly into the bit stream (reduces computational complexity in the digital audio bridge or adding different classes of audio).

The transformation block 110 is used to convert the time domain audio input 100 into the frequency domain or some other transform domain. The purpose of this transformation is to facilitate data compression more easily and to permit parallel processing techniques which may be more efficient for computer engines.

Two examples of transformations include the Fast Fourier Transform (FFT) and Sub Band Coding. Both of these techniques are well known to the engineering community. In both cases, the classes of service of FIG. 1 can be easily accommodated by increasing the number of frequency components (bandwidth) determined using the FFT or by adding additional sub-band filters to expand the bandwidth of the transformed signal. FIG. 1 is a visualization of the primary sub-bands making up the different classes of signals. A similar diagram can be drawn showing more frequency components for the FFT. Other transform techniques (Discrete Cosine Transform, Discrete Sinusoidal Transform, etc.) can also be used in the present invention, as long as this "additive" capability representing increasing quality (class) is maintained.

The transformation process provides no "compression" itself. Data is compressed by a quantizer in quantization block 120. In general, the amount of data generated by transformation is equal to or greater than data representing the signals in the time domain. For example, the FFT produces a real and an imaginary frequency component for each single time sample which increases the data content. Thus, it is necessary to perform additional operations to compress the data.

Filtering/masking block 115 accomplishes some compression before the quantizer in quantization block 120. For example, the number of frequency components are reduced using center clipping, power masking, and/or perceptual filtering, all well known in the art. These all have the effect of eliminating frequency components which have a minimal effect on the audio quality while substantially reducing the number of signals to be quantized.

Quantizers are well documented in the literature. The most optimal system uses an adaptive quantizer which can take advantage of the signal statistics as a function of time to minimize the output bit rate. For point to point communication, this is the selected approach. For the case of multi-point conferencing however, the goal is to minimize the computational requirements of the audio bridge. This is best accomplished by using a fixed quantizer which is identical for all participants within each class "adder" of audio. Thus, there are separate quantization tables for each sub-band class adder of audio, but within each class adder (sub-band), all participants use the same quantization tables. A tradeoff is made here between lowering computational complexity at both the source and the audio bridge using the fixed quantizers verses minimizing the bit rate by using higher complexity adaptive quantizers.

Entropy encoding block 130 takes advantage of the quantized signal statistics to optimally encode the data. The result of this process is to create variable length codes representing the data output of the quantizers. The data reduction technique of entropy encoding itself is well known in the technology. Other data known reduction techniques could also be used such as run length encoding if a variable data rate 135 is permitted. The variable data rate 135 works well with point to point conferencing but creates a logistics overhead when used with multi-point conferencing through a digital audio bridge. In this case, fixed length data or fixed data rate coding is preferred (again giving up some efficiency in data rate to gain a reduction in computational complexity). Since this embodiment of the scalable compression algorithm is being defined in conjunction with the digital audio bridge and multi-point conferencing, the fixed data rate format 125 is used.

As the class of audio service increases and thus with the increase in quality, the bit rate will increase as well. The actual bit rates are determined by the audio compression algorithm and will drop for a given class of service as the complexity of the algorithm increases.

The following Table 1 illustrates bit rates and packet size used in an embodiment of the scalable compression algorithm of the present invention. Although algorithmic improvements will reduce the bit rate in the future, bit rates in Table 1 is used to define the formatting concept 145 of this embodiment of the present invention.

TABLE 1

EXAMPLE BIT RATE/PACKET SIZE

| class | bandwidth | bit rate | sample rate | sample/frame |
|---|---|---|---|---|
| P | 30–3.2 khz | 16 Kbps | 8 Ksps | 400 |
| A | 30–7 khz | 24 Kbps | 22 Ksps | 600 |
| F | 30–15 khz | 32 Kbps | 44 Ksps | 800 |
| C | 30–20 khz | 40 Kbps | 44 Ksps | 1000 |

The bit rate column illustrates example bit rates which may vary depending on the complexity and quality of algorithms. The sample rate column are based on standard PC sound system sampling rates of 8,11,22, and 44 Ksps. It is assumed for the sample/frame column that a 25 msec audio frame is used i.e., 400 audio packets per seconds. Once data is formatted in formatter block 145, compressed bit stream 140 is transmitted through communication channel 150.

In entropy decoding block 160, the composite signal is decoded through entropy compressed bit stream, and deformatted in parser block 165. In de-quantization block 170, the composite signal is de-quantized using a scaled quantization table. In reconstruction block 180, the composite signal is demodulated using inverse transform (such as Sub-band decoding, or STC decoding). The type of inverse transform used is dependent on the class of service of the user. The transformed signal is then output back to the user.

Figure 3:
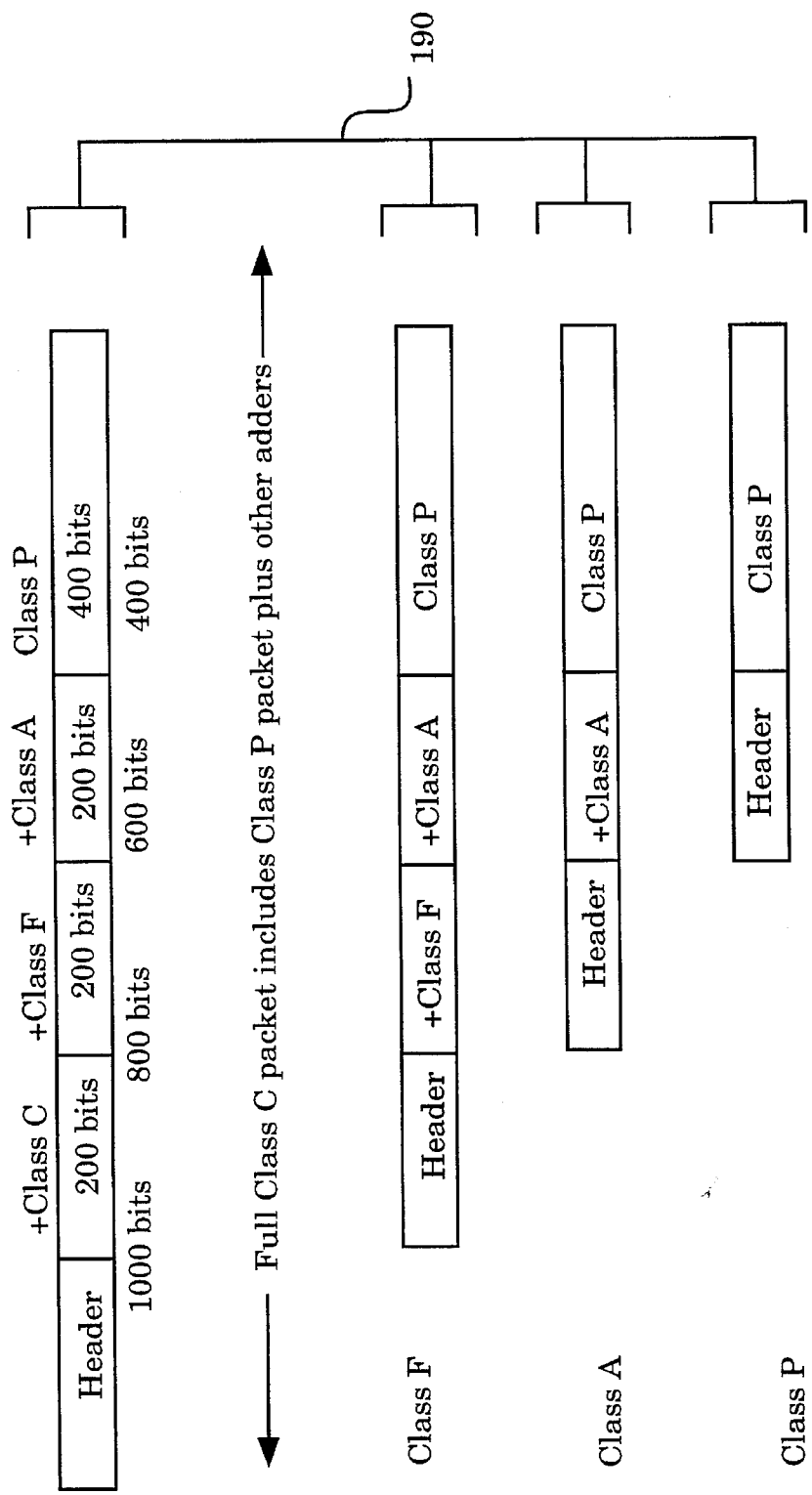
FIG. 3 illustrates an exemplary set of data packets constructed based on Table 1 as a function of audio classes.

FIG. 3 illustrates an exemplary set of data packets constructed based on Table 1 as a function of audio classes. Each communication packet 190 contains the basic Class P data packet of 400 bits (16 Kbps) plus the additional Class adders at 200 bits each (an increase of 8 Kbps/class) indicated by the +Class( ) shown in the Figure. Thus, for a Class F (FM quality audio) there are two class adders added to the Class P packet, specifically +Class A (AM quality audio) and +Class F (FM quality audio) yielding a total audio packet of 800 bits plus the Header. The Header is not specified since it will depend on the communication environment and other data (e.g. user data, video data) that are being combined with the audio packets for audio/video/data conferencing.

Figure 4:
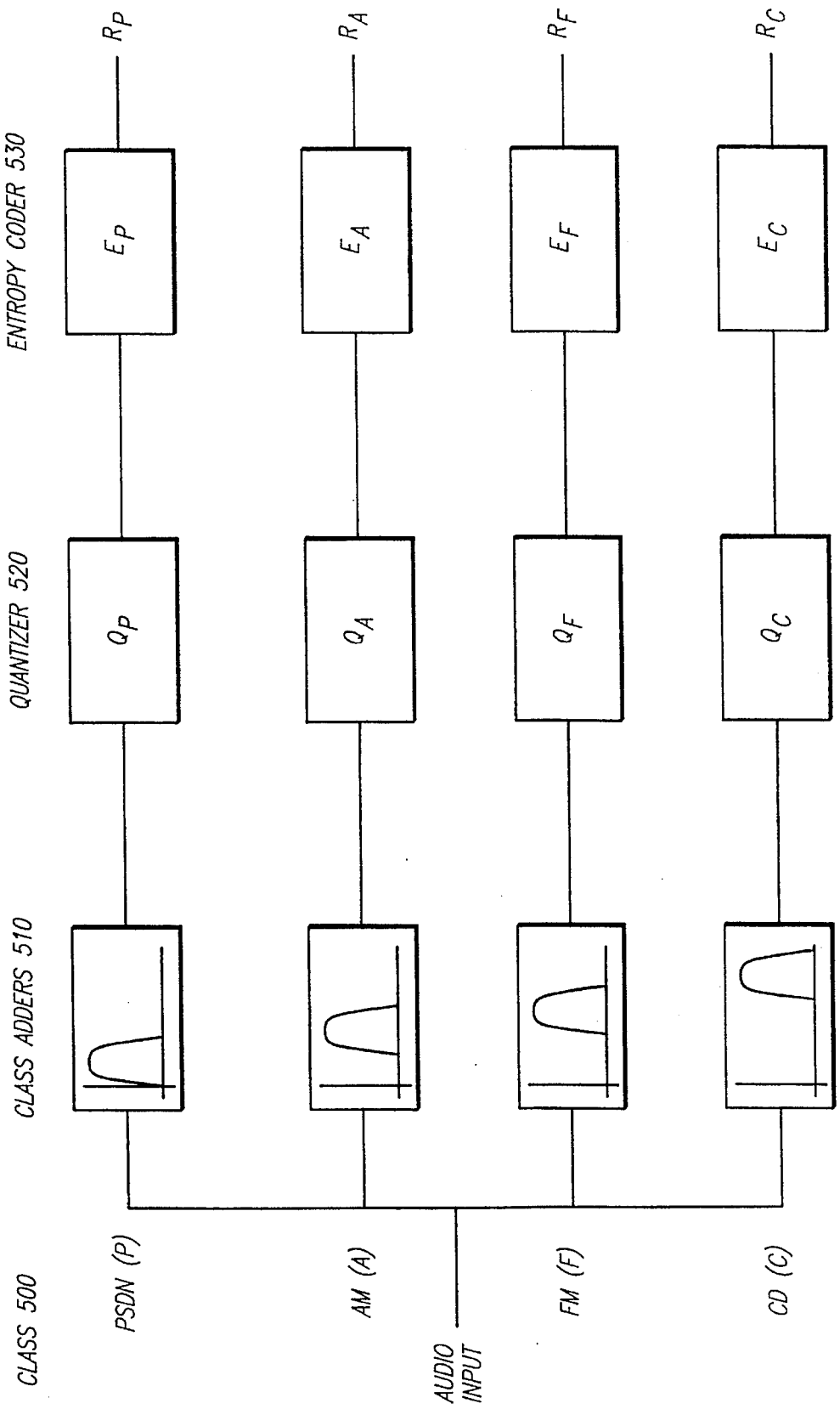
FIG. 4 shows a block diagram depicting the actual process involved in generating the class adder packets.

FIG. 4 shows a block diagram depicting the actual process involved in generating the class adder packets. Each class adder packets for each Class 500 are generated by processing of the audio data through Class Adders 510, Quantizer 520 and Entropy Coder 530. This process results in bit rates Rp, Ra, Rf, and Rc corresponding to the additional data rates for each Class 500. For example, the total bit rate is Rt=Rp+Ra+Rf+Rc for the Class C operation. Fixed rate encoding does not use the entropy blocks under Entropy coder 530.

Regardless of the class level being transmitted, any class user that is of an equal or less class can extract exactly the bits required to communicate at that class level. In addition, in the audio bridge implementation of the present invention, each of the class adders are added/subtracted from other class adders to create the composite class adders suitable for each user.

The implementation of a low cost digital audio bridge using scalable audio compression are illustrated in FIGS. 5–8 and the accompanying description.

Figure 5:
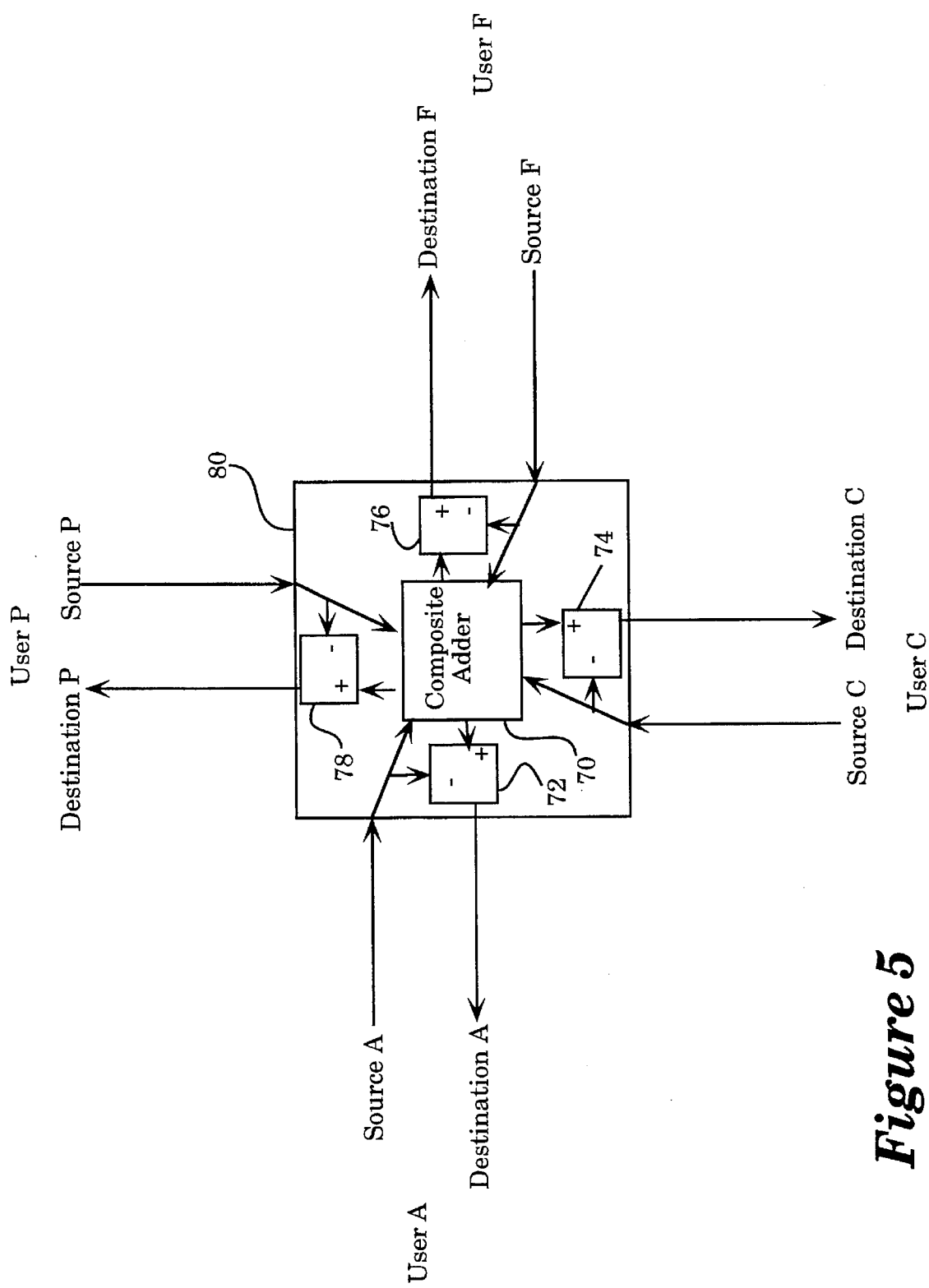
FIG. 5 is an exemplary multi-point bridge unit accommodating four users representing four different classes of audio as referenced in FIG. 1.

FIG. 5 illustrates an exemplary multi-point bridge with four users representing four different classes of audio as was illustrated in FIG. 1. The multi-point bridge of the present invention allows different users with different classes of audio capability to talk to each other and preserve the maximum class each user can sustain.

User P has POTS (speech only), user F has FM quality audio, user C has CD audio quality and user A has AM quality audio. A multi-point bridge of the present invention allows each user to maintain their class of service while still being compatible with lower classes of service. For example, user C who has CD audio quality would not want to be constrained by the lowest common denominator which is user P who has only POTS or only speech capability. User C would prefer to have CD audio quality if any of the other users have such quality or any other quality between CD audio and POTS.

A general formula for audio bridging is:

destination A signal=composite−source A signal =(source A+source B+. . . +source n)−source A The exemplary multi-point bridge illustrated in FIG. 5 has four signal sources. Composite adder 70 and port adders 72, 74, 76 and 78 are designed based on the type of transform technology used in the audio compression system. For example, in today's analog bridge, the composite adder is simply a summing operational amplifier and the port adders are a difference circuit. For a transform based bridge of the present invention, the composite adder and the port adders depend on the method of transform processing. Exemplary methods of transform processing which may be used in the present invention include FFT (Fast Fourier Transform), STC (Sinusoidal Transform Coding) and Sub-band Coding (SBC). The implementation detail of the audio bridge would be readily apparent to one skilled in the art, based upon the operational description described herein.

FIG. 6 illustrates the effect of audio bridging on two users in a four way conferencing situation. More specifically, FIG. 6 illustrates the addition of four different signals, source P through source A, to form two other signals representing the destination composite audio signal to be retransmitted to destinations P and C for users with audio classes P and C, respectively. Here, as was illustrated in FIG. 1, the user with audio class P ("user P") has POTS capability and the user with audio class C ("user C") has CD audio capability.

Source signals 50 are illustrated in the first column with different numbers of sub-bands representing different classes of signals. In order to form the destination composite signals, only the sub-bands for each source signal corresponding to the class of the destination are combined. The shaded sub-bands indicates sub-bands for each source signal corresponding to the class of the destination used to form the composite signals in the second and third columns.

The second column illustrates destination P composite signal (P=F+C+A) through class P sub-band 52. The third column illustrates destination F composite signal (F=P+F+A) through class F sub-band 54. Thus, composites of sub-bands from all four different classes are formed. For example, the user P has the inputs from class F, C and A, but not its own input. Since user P only has the POTS capability or the 30 to 3,200 hertz capability, only the sub-bands for each of the other user which cover that particular bandwidth are added together to form the composite. It is assumed here that user P's speech algorithm includes the frequency transformation as well as filters which reduce the bandwidth or bit rate for the frequency transformation.

Since each of the users are using the same transform technique as user P, if user P applies the same filter used for its input to the other bands, user P would have a substantially reduced quality but will be intelligible. For example, if the other users were playing music, user P would have lower quality, however if the other users were speaking, then user P would be able to understand what they are saying.

The second example illustrating composites of sub-bands is for user C with CD audio quality. The composite sub-band for user C has all of the spectral components with all of the other users added together in their separate bands. This composite maintains most of the quality of any one of the inputs. Again, user C does not have the C input spectrum as part of the composite signal because user C does not want to hear its own input.

FIGS. 7 and 8 show visualizations of the port adder and composite adders referenced in FIG. 4. Separate data paths are shown for the different class sub-bands in these diagrams. Further, the implementation may be performed on a microprocessor and the data segmentation may be performed in memory.

FIG. 8 illustrates the composite adder referred to in FIG. 5. Information extracted from the different audio class adders are transmitted as incoming packets 200 to composite adder 70 to produce composite encoded bit stream 210. CD information from packets 230 and 360 are transmitted to CD adder 240 for CD user class 220 to produce composite CD adder encoded bit stream 250. FM information from packets 230, 270 and 360 are transmitted to FM adder 280 for FM user class 260 to produce composite FM adder encoded bit stream 290. AM information from packets 230, 270, 310 and 360 are transmitted to AM adder 320 for AM user class 300 to produce composite AM adder 330. PSDN information from packets 230, 270, 310, 350 and 360 are transmitted to PSDN adder 370 to produce composite PSDN adder encoded bit stream 380 for PSDN user class 340.

FIG. 7 illustrates the port adders referred to in FIG. 5. The information extracted from each bandwidth for each audio class are subtracted from the corresponding audio class composite encoded bit stream using a subtractor. Bridge input packet 400 is formed from the audio input from CD class user 390. CD composite 250 and CD information from bridge input packet 400 are transmitted to CD subtractor 420. CD subtractor 420 subtracts the CD information from CD composite 250 since the CD class user does not want hear his or her own voice. The output becomes part of bridge port output packet 430. FM composite 290 and FM information from bridge input packet 400 are transmitted to FM subtractor 440. FM information is subtracted from FM composite 290 producing information to be output to the FM class user through bridge port output packet 430. AM composite 330 and AM information from bridge input packet 400 are transmitted to AM subtractor 450 to output information to AM class user through bridge port output packet 430. PSDN composite and PSDN information from bridge input packet 400 are transmitted to PSDN subtractor 460 to output information for the PSDN class user through bridge port output packet 430.

What has been described is a method and apparatus for scalable audio compression and multi-point bridging. While certain exemplary embodiments have been described in detail and shown in the accompanying drawings, it is to be understood that such embodiments are merely illustrative of and not restrictive on the broad invention and that this invention not be limited to the specific arrangements and constructions shown and described, since various other modifications may occur to those ordinarily skilled in the art.

I claim:

1. A method of compressing audio signal and performing an audio bridge on the audio signal comprising the steps of:

defining classes for a plurality of audio signals, each of said plurality of audio signals originating from an audio source of a single class;

transforming each of said plurality of audio signals into sub-band signals using linear transformation; and performing an audio bridge to said sub-band signals of each of said plurality of audio signals, creating a composite audio bit stream for each of said plurality of audio signals, said composite audio bit stream for each of said plurality of audio signals transmitted to its destination.

2. The method of claim 1 wherein said step of transforming further comprises the step of transforming each of said plurality of audio signals into a frequency domain, creating a plurality of transformed sub-band audio signals.

3. The method of claim 1 wherein said step of performing an audio bridge further comprises the steps of:

compressing said sub-band signals eliminating selected frequency components;

adding said sub-band signals to form a sub-band signal composite for a given class of audio signal;

quantizing said sub-band signal composite creating a quantized composite audio bit stream for each of said plurality of audio signals;

entropy encoding said quantized composite audio bit stream creating an encoded composite audio bit stream; and subtracting an audio signal corresponding to said given class from said encoded composite audio bit stream to form a composite audio bit stream.

4. The method of claim 3 further comprising the steps of:

receiving said composite audio bit stream at said destination;

decoding said composite audio bit stream through an entropy compressed bit stream creating a decoded composite signal;

de-quantizing said decoded composite signal using a fixed quantization table; and demodulating said de-quantized composite signal using inverse transform creating a demodulated composite signal.

5. The method of claim 4 further comprising the step of de-formatting said demodulated composite signal.

6. An apparatus for compressing audio signal and performing an audio bridge on the audio signal comprising:

means for transforming each of a plurality of audio signals of different classes into a sub-band signal, each audio signal in said plurality of audio signals originating from an audio source of a single class; and means for performing an audio bridge to said sub-band signal of each of said plurality of audio signals, creating a composite signal for each of said plurality of audio signals, said composite signal of each of said plurality of audio signals transmitted to its destination.

7. The apparatus of claim 6 wherein said means for transforming further comprises means for transforming each of a plurality of audio signals of different classes into a frequency domain, creating a transformed audio sub-band signal.

8. The apparatus of claim 6 wherein said means for performing an audio bridge further comprises:

means for compressing said sub-band signals eliminating selected frequency components;

means for adding said sub-band signals to form a sub-band signal composite for a given class;

means for quantizing said sub-band signal composite by class, creating a quantized composite audio bit stream for each of said plurality of audio signals;

means for entropy encoding said quantized composite audio bit stream by a class adder, creating an encoded composite audio bit stream; and means for subtracting an audio signal corresponding to said given class from said encoded composite audio bit stream to form a composite audio bit stream.

9. The apparatus of claim 8 further comprising the steps of:

means for receiving said composite audio bit stream;

means for decoding said composite audio bit stream creating a decoded composite signal;

means for de-quantizing said decoded composite signal using a scaled quantization table to create a de-quantized composite signal; and means for demodulating said de-quantized composite signal using inverse transform creating a demodulated composite signal.

10. The apparatus of claim 9 further comprising means for de-formatting said demodulated composite signal.

11. An apparatus for compressing audio signal and performing an audio bridge on the audio signal comprising:

a transforming element for transforming each of a plurality of audio signals of different classes into sub-band signals, each audio signal in said plurality of audio signals originating from an audio source of a single class; and an audio bridge element adding said sub-band signals of each of said plurality of audio signals, creating a composite signal for each of said plurality of audio signals, said composite signal of each of said plurality of audio signals transmitted to its destination.

12. The apparatus of claim 11 wherein said transforming element further comprises a transforming element for transforming each of said plurality of audio signals into a frequency domain, creating a transformed audio Sub-band signal.

13. The apparatus of claim 11 wherein said audio bridge element further comprises:

a compression element for compressing said sub-band signals using masking or filtering to eliminate selected frequency components;

an adding element for adding said sub-band signals to form a sub-band signal composite for a given class;

a quantizing element for quantizing said sub-band signal composite by class, creating a quantized composite audio bit stream for each of said plurality of audio signals of different classes;

an entropy encoding element for entropy encoding said quantized composite audio bit stream creating an encoded composite audio bit stream; and a subtracting element for subtracting an audio signal corresponding to said given class from said encoded composite audio bit stream to form a composite audio bit stream.

14. The apparatus of claim 13 further comprising:

a receiving element for receiving said composite audio bit stream;

a decoding element for decoding said composite audio bit stream through an entropy compressed bit stream creating a decoded composite signal;

a de-quantizing element for de-quantizing said decoded composite signal using a scaled quantization table creating a de-quantized composite signal; and a demodulating element for demodulating said de-quantized composite signal using inverse transform creating a demodulated composite signal.

15. The apparatus of claim 14 further comprising a de-formator element for de-formatting said demodulated composite signal.

16. A system for compressing audio signal and performing an audio bridge on the audio signal comprising:

means for transforming each of a plurality of audio signals of different classes into sub-band signals, each audio signal in said plurality of audio signals originating from an audio source of a single class; and means for performing an audio bridge to said sub-band signals of each of said plurality of audio signals, creating a composite signal for each of said plurality of audio signals, said composite signal of each of said plurality of audio signals transmitted to its destination.

17. The system of claim 16 wherein said means for transforming further comprises means for transforming each of a plurality of audio signals of different classes into a frequency domain, creating a transformed audio sub-band signal.

18. The system of claim 16 wherein said means for performing an audio bridge further comprises:

means for compressing said sub-band signals eliminating selected frequency components;

means for adding said sub-band signals to form a sub-band signal composite for a given class;

means for quantizing said sub-band composite signal by class, creating a quantized composite signal for each of said plurality of audio signals;

means for entropy encoding said quantized composite signal by a class adder, creating an encoded composite signal; and means for subtracting an audio signal corresponding to said given class from said encoded composite signal to form a composite audio bit stream.

19. The system of claim 18 further comprising the steps of:

means for receiving said composite audio bit stream;

means for decoding said composite audio bit stream through an entropy compressed bit stream creating a decoded composite signal;

means for de-quantizing said decoded composite signal using a scaled quantization table creating a de-quantized composite signal; and means for demodulating said de-quantized composite signal using inverse transform creating a demodulated composite signal.

20. The system of claim 19 further comprising means for de-formatting said demodulated composite signal.

21. A system for compressing audio signal and performing an audio bridge on the audio signal comprising:

a transforming element for transforming each of a plurality of audio signals of different classes into a sub-band signal, each audio signal in said plurality of audio signals originating from an audio source of a single class; and an audio bridge for adding sub-band signals of each of said plurality of audio signals, creating a composite signal for each of said plurality of audio signals, said composite signal of each of said plurality of audio signals transmitted to its destination.

22. The system of claim 21 wherein said transforming element further comprises a transforming element for transforming each of said plurality of audio signals into a frequency domain, creating a transformed audio sub-band signal.

23. The system of claim 21 wherein said audio bridge element further comprises:

a compression element for compressing said sub-band signals using masking or filtering to eliminate selected frequency components;

an adding element for adding said sub-band signal of each of said plurality of audio signals to form a sub-band signal composite for a given class;

a quantizing element for quantizing said sub-band signal composite by class, creating a quantized composite signal for each of said plurality of audio signals;

an entropy encoding element for entropy encoding said quantized composite signal creating an encoded composite signal; and a subtracting element for subtracting an audio signal corresponding to said given class from said encoded composite signal to form a composite audio bit stream.

24. The system of claim 23 further comprising:

a receiving element for receiving said composite audio bit stream;

a decoding element for decoding said composite audio bit stream through an entropy compressed bit stream creating a decoded composite signal;

a de-quantizing element for de-quantizing said decoded composite signal using a scaled quantization table creating a de-quantized composite signal; and a demodulating element for demodulating said de-quantized composite signal using inverse transform creating a demodulated composite signal.

25. The system of claim 24 further comprising a de-formattor element for de-formatting said demodulated composite signal.

* * * * *